April 24, 1956  R. M. SEDDON ET AL  2,743,102
RUBBER SHOCK ABSORBERS
Original Filed Oct. 16, 1951
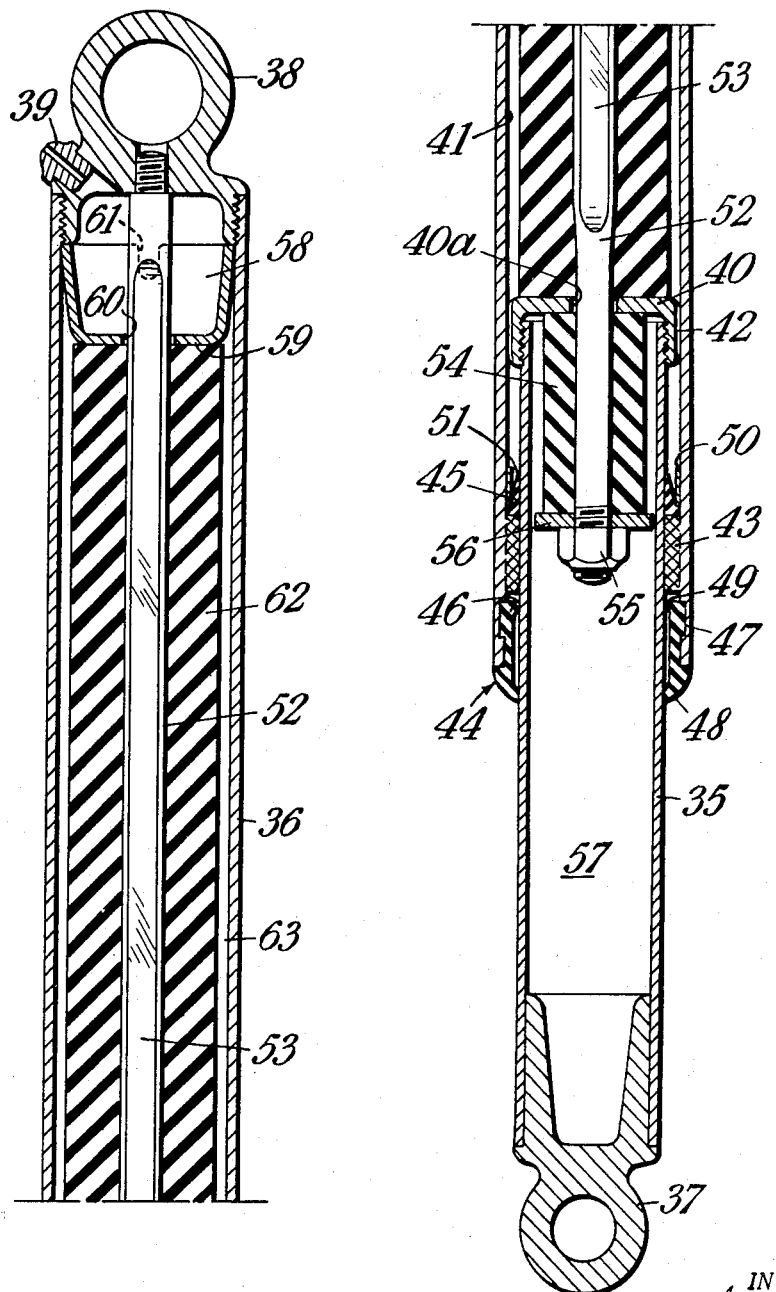
INVENTORS
Robert Maxwell Seddon
David William Brambani
BY
Benj. T. Rauber
their attorney

United States Patent Office 2,743,102
Patented Apr. 24, 1956

2,743,102

RUBBER SHOCK ABSORBERS

Robert Maxwell Seddon, Walmley, Sutton Coldfield, and David William Brambani, Small Heath, Birmingham, England, assignors to Dunlop Rubber Company Limited, London, England, a British company Original application October 16, 1951, Serial No. 251,502, now Patent No. 2,708,112, dated May 10, 1955. Divided and this application December 29, 1954, Serial No. 478,278

4 Claims. (Cl. 267—63)

This application is a division of our co-pending application Serial No. 251,502, filed October 16, 1951, now Patent No. 2,708,112, issued May 10, 1955.

Our invention relates to shock absorbers and more particularly to self-oiling shock absorbers incorporating a compressible hollow-section rubber cushioning element or elements mounted coaxially on a supporting member.

In our co-pending application Serial No. 98,420, filed June 11, 1949, now Patent No. 2,683,044, issued July 6, 1954, and in British Patent No. 660,135, a shock absorber is described in which the rubber cushioning elements, carried coaxially on a plunger, are lubricated by movement of the shock absorber which causes an end of the plunger to displace oil from a reservoir and to deliver it to the elements. Thus the rubbing surface formed by the plunger and the elements is lubricated.

It is desirable from the point of view of both maintenance and simplicity of construction that a single lubricating system should be provided for both purposes.

It is an object of the present invention to provide a self-oiling shock absorber wherein both the rubber elements and the relatively slidable members are automatically lubricated from a single source.

It is a further object of the invention to provide a self-oiling shock absorber the construction of which facilitates topping-up of the oil source.

According to our invention a shock absorber comprises inner and outer hollow section telescoping members adapted to be connected to members subject to relative displacement, the members being maintained in spaced apart relationship by means of a bearing and the inner member constituting an oil sump, means for replenishing the sump, a member such as a supporting rod located coaxially within the outer member and extending into the inner member through a clearance hole in the inner end thereof, means for limiting extension of the shock absorber, a hollow section rubber cushioning element forming a close fit around the supporting member and spaced apart from the inner wall of the outer member, the said element being located between the inner end of the inner member and the end of the outer member remote therefrom and a spacing member adjacent the end of the cushioning element remote from the inner member, said spacing member providing a passageway for flow of oil between the inside of the said element and the space between said element and the outer member.

Preferably the spacing member comprises a rigid cup-shaped oil reservoir provided on its periphery with overflow slots.

As the shock absorber is compressed the spacing element is contracted axially and expands slightly radially forming a space about the supporting rod and the lower part of the supporting rod is displaced a corresponding distance into the inner member, displacing lubricant through the space about the supporting member into the reservoir filling it and then overflowing back into the sump.

The features of our invention are illustrated by way of example in the accompanying drawing which shows a longitudinal section of a shock absorber embodying the invention and suitable for the rear suspension strut of a motor cycle.

The shock absorber illustrated in the drawing comprises telescopic cylindrical inner and outer members 35 and 36, the remote ends of the cylindrical members each having a mounting lug, 37 or 38, rigidly attached thereto, each lug being provided with a hole drilled therethrough normal to its longitudinal axis. The lug 38 attached to the outer member is provided with an oiling nipple 39 through which oil can be fed to the inside of the outer member as will be more particularly described in a later part of the specification.

The end of the inner member 35 within the outer member 36 is provided with an external screw thread having a cap 40 screwed thereon, provided with a coaxial hole 40ª. The outer peripheral surface of the cap is adapted to slide on the inside wall 41 of the outer member and is provided with four axially extending grooves 42 extending for the whole length thereof. Thus the inner member is spaced apart from the wall of the outer member by the thickness of the peripheral wall of the cap.

An annular bearing member 43 is rigidly attached to the inside wall of the outer member and is located between the cap 40 and the end of the outer member 36, this bearing also serving to retain the inner and outer members in spaced apart relationship.

An outer annular rubber seal 44 and an inner annular rubber seal 45 are located one on each side of the bearing 43, the outer seal 44 abutting the extreme end of the outer member and being held in position by means of a portion 46 of the seal which fits into a corresponding annular grove 47 formed on the inner wall of the outer member. The bore of the outer rubber seal is provided with annular lips 48 and 49, one at each end, which project towards the inner member so as to contact the surface thereof. The bore of the rubber seal between the lips stands proud of the surface of the inner member. The inner seal 45 is held in position by means of an annular spring 50 sprung against the inner wall of the outer member, the rubber being flared so that an annular flared portion 51 extends towards the cap 40.

One end of a supporting rod 52 screw threaded at both ends, fits into a tapped hole formed coaxially in the lug 38 attached to the outer member and extends coaxially through the outer member, through the hole formed in the cap, forming a clearance fit therewith, and into the inner member. An axially extending flat portion 53 is provided on the rod and extends from a point adjacent to the lug to a point adjacent to the cap.

The portion of the supporting rod extending into the inner member carries a tubular rubber buffer 54, one end face of which abuts a radially extending face of the cap. The buffer 54 is held in position on the end of the supporting rod by means of a nut 55, a washer 56 being interposed between the nut and the rubber buffer.

The chamber formed between the cap 40 and the lug 37 attached to the inner member forms an oil sump 57 the operation of which will be more particularly described later in the specification.

A metal pressing in the form of a cup-shaped reservoir 58, located coaxially within the outer member with the rim thereof abutting the end of the lug 38 attached to the outer member, is provided with walls which taper inwardly toward the base 59 of the cup, which is provided with a clearance hole 60 through which the supporting member 52 projects. The rim of the reservoir fits closely against the inside wall of the outer member and two diametrically opposite substantially rectangular cutaway portions 61 are formed adjacent the rim of the reservoir and extend about one third of the way down its wall.

A tubular rubber cushioning element 62 is mounted on the supporting rod 52, the inside diameter of the cushioning element before fitting on the rod being smaller than the diameter of the rod, so that when fitted the element tightly grips the rod. The outside diameter of the cushioning element 62 is less than the inside diameter of the outer member 36 so that an annular clearance space 63 is formed between the element 62 and the outer member 36. One end face of the cushioning element abuts the base 59 of the reservoir and is adhered thereto, the other end face of the cushioning element being adhered to a radially extending face of the cap 40.

During assembly of the parts of the shock absorber, the sump 57 is filled with a suitable lubricating oil, the cup-shaped reservoir also being filled with the same type of lubricating oil through the oiling nipple 39.

The shock absorber is attached to a motor cycle so that when the rear wheel of the motor cycle is displaced upwards, the inner and outer members of the shock absorber will telescope. This compresses the cushioning element 62, the axial length of the element decreasing and the inside diameter of the element increasing so that an annular clearance space is formed between the wall of the supporting rod and the inside wall of the cushioning element. Simultaneously the rubber buffer 54 and a portion of the supporting rod 52 move axially into the oil sump 57, the supporting rod displacing oil from the sump into the annular clearance space. At the same time oil will flow from the reservoir 58 into this annular clearance space.

Recovery of the shock absorber causes the rubber cushioning element 62 to extend and the annular clearance space to contract. Simultaneously the rubber buffer 54 moves towards the cap. The combined effect of these movements, that is, the pumping effect of the buffer and the expelling effect of the contraction of the clearance space, is to cause the oil contained in the annular clearance space to be delivered into the reservoir so that the level of the oil therein returns to its initial position and excess oil runs out of the reservoir through the cutaway portion 61 formed in the rim thereof into the annular clearance space 63. The oil then falls by gravity down the annular clearance space 63 and runs through the four axially extending grooves 42 formed on the outer periphery of the cap. After passing through the cap the oil runs into the bearing 43 past the inner annular rubber seal 45 and provides lubrication therefor. The inner seal 45 limits the amount of oil which can flow into contact with the bearing, the operation of this seal being to wipe the outside wall of the inner member.

The inner lip 49 of the outer rubber seal 44 prevents oil from flowing past the bearing 43 while the outer lip 48 prevents foreign bodies, that is, mud and grit, from entering the bearing.

It will be noted from the foregoing description of the shock absorber illustrated in the accompanying drawing that both the rubber cushioning element and the shock absorber bearings are lubricated from a single source which can be replenished as described.

If the rubber parts of the shock absorbers are made from natural rubber, then a lubricating oil must be used which will not damage the rubber, for example, castor oil. The rubber parts may, however, be made from an oil-resistant synthetic rubber, for example, a butadiene acrylonitrile copolymer.

Having described our invention, what we claim is:

1. A shock absorber comprising inner and outer hollow section telescopic members adapted to be connected to members subject to relative displacement, the members being maintained in spaced apart relationship by means of a bearing and the inner member constituting an oil sump, means for replenishing the sump, a supporting member located coaxially within the outer member and fixed at one end to the outer member remote from the inner member and extending into the inner member through a clearance hole in the inner end thereof, means mounted on said supporting member in position to engage the inner telescopic member to limit extension of the shock absorber, a hollow section rubber cushioning element forming a close fit around the supporting member and spaced apart from the inner surface of the outer member, the said element being located between the inner end of the inner member and the end of the outer member remote therefrom and expanding radially when compressed to provide a space between itself and the supporting member, and a spacing member located adjacent the end of the cushioning element remote from the inner member, said spacing member having a passageway connecting said space between the element and the supporting member with the space between the element and the outer member, whereby when the cushioning element is compressed so that a space is formed between itself and the supporting member oil is displaced by the supporting member from the sump into the said formed space and through the passageway into the space between the element and the outer member so as to lubricate the bearing.

2. A shock absorber comprising inner and outer hollow section telescopic members adapted to be connected to members subject to relative displacement, the members being maintained in spaced apart relationship by means of a bearing and the inner member constituting an oil sump, means for replenishing the sump, a longitudinally extending supporting member located coaxially within the outer member and rigidly fixed to the end thereof remote from the inner member, the said supporting member extending into the inner member through a clearance hole formed in an end thereof, a hollow section rubber cushioning element forming a close fit around the supporting member and spaced apart from the inner surface of the outer member, the said element being located between the inner end of the inner member and the end of the outer member remote therefrom and expanding radially when compressed to provide a space between itself and the supporting member, means attached to the end of the supporting member within the inner member for absorbing the recoil of the cushioning element and a rigid cup-shaped oil reservoir the base of the reservoir contacting the end of the cushioning element remote from the inner member, and having a clearance hole therein through which the supporting member projects and the rim of the reservoir contacting the end of the outer member carrying the supporting member, the said rim having an overflow leading to the space between the element and the inner wall of the outer member, whereby when said hollow section telescopic element is moved inwardly in said outer hollow section telescopic element and said supporting element moves into said inner hollow section telescopic element to displace oil therefrom and said hollow section rubber cushioning element is compressed so that a space is formed between itself and the supporting member said oil may flow from the sump to the bearing through the bore of the cushioning element, the reservoir and the overflow.

3. A shock absorber which comprises an outer tubular member, an inner tubular member closed at its ends and slidable telescopically in said outer member, said inner member comprising an oil sump and having a clearance hole in the inner end thereof, a bearing between said members to hold them in spaced relation, a coaxial supporting rod fixed at one end to the end of the outer member and extending into the inner member through said clearance hole, a stop mounted on said supporting rod within said inner member in a position spaced at the limiting distance from the closed inner end of said inner member to limit the extension of said shock absorber, a hollow tubular rubber cushion element forming a close fit about said supporting rod and spaced from the inner surface of said outer member and extending from the inner end of said inner member to a distance short of the end of the outer member and a spacing member located adjacent to the end of said hollow tubular rubber cushioning element remote from the inner member and having a passageway from said rubber cushioning element to the space between said inner and outer members, said tubular rubber cushioning element expanding radially when compressed longitudinally to provide a space between itself and the supporting member said space extending from said inner member to said spacing member.

4. The shock absorbers of claim 3 in which said supporting rod has a flattened face within said tubular cushioning element.

References Cited in the file of this patent

UNITED STATES PATENTS

| | | |
|---|---|---|
| 1,653,122 | Ray | Dec. 20, 1927 |

FOREIGN PATENTS

| | | |
|---|---|---|
| 543,769 | France | June 9, 1922 |